United States Patent
Haber et al.

(10) Patent No.: US 11,920,113 B1
(45) Date of Patent: Mar. 5, 2024

(54) SEMI-AUTOMATED VESSEL-IN-VESSEL BEER BREWING AND PRECISION TIMED COOKING SYSTEM

(71) Applicants: Noah Avram Haber, San Francisco, CA (US); Steven Michael Thomas, Cambridge, MA (US)

(72) Inventors: Noah Avram Haber, San Francisco, CA (US); Steven Michael Thomas, Cambridge, MA (US)

(*) Notice: Subject to any disclaimer, the term of this patent is extended or adjusted under 35 U.S.C. 154(b) by 789 days.

(21) Appl. No.: 16/869,221

(22) Filed: May 7, 2020

Related U.S. Application Data

(60) Provisional application No. 62/844,635, filed on May 7, 2019.

(51) Int. Cl.
| | |
|---|---|
| *C12C 13/08* | (2006.01) |
| *C12C 1/125* | (2006.01) |
| *C12C 7/06* | (2006.01) |
| *C12C 7/14* | (2006.01) |

(52) U.S. Cl.
CPC ............ *C12C 13/08* (2013.01); *C12C 1/125* (2013.01); *C12C 7/06* (2013.01); *C12C 7/14* (2013.01)

(58) Field of Classification Search
CPC .......... C12C 13/08; C12C 1/125; C12C 7/06; C12C 7/14
USPC ......................................................... 99/280
See application file for complete search history.

(56) References Cited

U.S. PATENT DOCUMENTS

| | | | |
|---|---|---|---|
| 7,531,065 B2 * | 5/2009 | Yamamoto | B01D 1/0017 202/205 |
| 2014/0234482 A1 * | 8/2014 | Kempfert | C12C 13/10 99/278 |

* cited by examiner

*Primary Examiner* — Dana Ross
*Assistant Examiner* — Joseph W Iskra

(57) ABSTRACT

A semi-automated vessel-in-vessel beer brewing and precision timed cooking system is disclosed. This system enables automated, hands-off brewing from strike to boil, more efficient sparging, and precision timed cooking, and can be built as an add-on to existing vessel-in-vessel systems.

5 Claims, 9 Drawing Sheets

SEMI-AUTOMATED VESSEL-IN-VESSEL BEER BREWING AND PRECISION TIMED COOKING SYSTEM

CLAIM OF BENEFIT TO PRIOR APPLICATION

This application claims benefit to U.S. Provisional Patent Application 62/844,635, entitled "Actuator and sensing system for automating all-grain brewing in a vessel-in-vessel brewing setup," filed May 7, 2019. The U.S. Provisional Patent Application 62/844,635 is incorporated herein by reference.

BACKGROUND

Embodiments of the invention described in this specification relate generally to vessel-in-vessel brewing systems, and more particularly, to a semi-automated vessel-in-vessel beer brewing and precision timed cooking system.

Conventional vessel-in-vessel brewing methods commonly involve a brewer (or user) to attend to the brewing process and apply manual, physical exertion at different points during the process from strike to boil. As such, there are no existing systems that fully automate the vessel-in-vessel brewing process. Specifically, the existing conventional vessel-in-vessel brewing methods require human attention and exertion at several staging which result in a variety of problems. These problems and physical/human demands include, without limitation, (1) starting the mashing process (striking) requires manually placing grains in the heated water, (2) a great deal of strength is required to lift the inner vessel out after the mashing process is complete, (3) sparging with this method requires manual labor, (4) sparging with this method is less efficient than continuous/fly sparging, (5) efficient continuous/fly sparging is not possible with existing conventional vessel-in-vessel brewing methods due to the inability to control flow of wort out of the inner vessel, (6) existing vessel-in-vessel brewing devices require manual labor to move the brewing process forward from heating strike water to boiling wort (i.e., they are not automated), and (7) existing vessel-in-vessel brewing devices cannot be used for precision timing of non-brewing cooking without precise human labor. Accordingly, there are no existing conventional vessel-in-vessel brewing methods, devices, or other setups which automate the brewing process from strike to boil, or can be used to continuously sparge, or be used for precision timed cooking automatically.

Therefore, what is needed is a way to automate vessel-in-vessel brewing from strike to boil and to continuously sparge and/or be used for precision timed cooking automatically.

BRIEF DESCRIPTION

A novel semi-automated vessel-in-vessel beer brewing and precision timed cooking system is disclosed. In some embodiments, the semi-automated vessel-in-vessel beer brewing and precision timed cooking system enables automated, hands-off beer brewing from strike to boil, more efficient sparging, and precision timed cooking, and can be built as an add-on to existing vessel-in-vessel systems.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel semi-automated vessel-in-vessel beer brewing and precision timed cooking system. In some embodiments, the semi-automated vessel-in-vessel beer brewing and precision timed cooking system enables automated, hands-off beer brewing from strike to boil, more efficient sparging, and precision timed cooking, and can be built as an add-on to existing vessel-in-vessel systems.

As stated above, there are no existing conventional vessel-in-vessel brewing methods, systems, or devices that fully automate the vessel-in-vessel brewing process, and the existing conventional vessel-in-vessel options are plagued by problems and physical/human demands including (1) starting the mashing process (striking) requires manually placing grains in the heated water, (2) a great deal of strength is required to lift the inner vessel out after the mashing process is complete, (3) sparging with this method requires manual labor, (4) sparging with this method is less efficient than continuous/fly sparging, (5) efficient continuous/fly sparging is not possible with existing conventional vessel-in-vessel brewing methods due to the inability to control flow of wort out of the inner vessel, (6) existing vessel-in-vessel brewing devices require manual labor to move the brewing process forward from heating strike water to boiling wort (i.e., they are not automated), and (7) existing vessel-in-vessel brewing devices cannot be used for precision timing of non-brewing cooking without precise human labor. Thus, there are no existing conventional vessel-in-vessel brewing methods, devices, or other setups which automate the brewing process from strike to boil, or can be used to continuously sparge, or be used for precision timed cooking automatically. Embodiments of the semi-automated vessel-in-vessel beer brewing and precision timed cooking system described in this specification solve such problems by allowing users to fully automate the brewing process from starting the mashing process to beginning the boil, including continuous sparging, using a home brewing-friendly vessel-in-vessel design. The automation is achieved through a mechanism which requires very minimal additional parts and engineering beyond what already exists in conventional all-in-one brewing systems, minimizing the cost and complication of entry.

Figure 1:
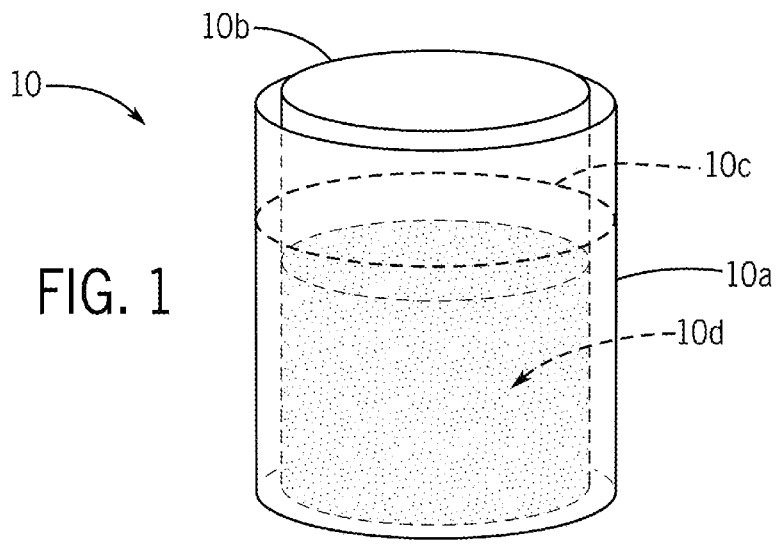
FIG. 1 conceptually illustrates a schematic perspective view of a simplified vessel-in-vessel brewing system in some embodiments.

By way of example, FIG. 1 conceptually illustrates a schematic perspective view of a simplified vessel-in-vessel brewing system that makes up a core of a semi-automated vessel-in-vessel beer brewing and precision timed cooking system 10. As shown in this figure, as the core of the semi-automated vessel-in-vessel beer brewing and precision timed cooking system 10, the simplified vessel-in-vessel brewing system includes an outer vessel 10a, an inner vessel 10b, mash water 10c, and grain 10d. As this example demonstrates, the simplified vessel-in-vessel brewing system is a minimal home-brewing friendly vessel-in-vessel system. However, the design of the simplified vessel-in-vessel brewing system, by itself, requires regular human attention and places great physical demands on the user during the process from strike to boil.

Embodiments of the semi-automated vessel-in-vessel beer brewing and precision timed cooking system described in this specification differ from and improve upon currently existing options. In particular, some embodiments of the semi-automated vessel-in-vessel beer brewing and precision timed cooking system enhance the existing, conventional vessel-in-vessel process by adding low-cost actuation and sensing to automate and enhance the brewing and/or cooking process.

In addition, some embodiments of the semi-automated vessel-in-vessel beer brewing and precision timed cooking system improve upon the currently existing, conventional vessel-in-vessel methods, systems, and devices which require a large amount of difficult labor, reduced repeatability and precision, and limited functionality. By contrast, the semi-automated vessel-in-vessel beer brewing and precision timed cooking system semi-automated vessel-in-vessel beer brewing and precision timed cooking system of the present disclosure enables automated, hands-off brewing from strike to boil, more efficient and continuous sparging, and precision timed cooking, and can be built as an add-on to existing vessel-in-vessel systems.

The semi-automated vessel-in-vessel beer brewing and precision timed cooking system of the present disclosure may be comprised of the following elements. This list of possible constituent elements is intended to be exemplary only and it is not intended that this list be used to limit the semi-automated vessel-in-vessel beer brewing and precision timed cooking system of the present application to just these elements. Persons having ordinary skill in the art relevant to the present disclosure may understand there to be equivalent elements that may be substituted within the present disclosure without changing the essential function or operation of the semi-automated vessel-in-vessel beer brewing and precision timed cooking system.

1. Outer vessel/urn
2. Inner vessel, with perforated false bottom, that fits inside the outer vessel
3. Heating element (usually already integrated into outer vessel)
4. Temperature sensor (usually already integrated into outer vessel)
5. Linear actuators
6. Mounting structures for attaching linear actuators/lifting mechanism to outer vessel
7. Mounting structures for attaching linear actuators/lifting mechanism to inner vessel
8. Pump (often already integrated into outer vessel of brewing system)
9. Pump outlet (often already integrated into outer vessel of brewing system)
10. Pump inlet (often already integrated into outer vessel of brewing system)
11. Spigot or liquid outlet for outer vessel (often already integrated into outer vessel of brewing system)
12. Actuated valve connecting outer vessel spigot with pump inlet
13. External sparge water source
14. Actuated valve connecting external sparge water source with pump inlet
15. Inner vessel inlet for recirculated wort/water and sparge water
16. Manifold for distributing water/wort over top of grain bed in inner vessel, attached to inner vessel inlet
17. Float switch on top of grain bed
18. Electrical control/logic mechanism (micro-controller: ESP-32-based micro-controller board. Alternatives include, but are not limited to, ESP-8266 based micro-controller, Arduino Mega 2560, Raspberry Pi, etc.). User interface is based on a combination of a touch screen and/or wireless (e.g., WiFi or Bluetooth) connection to a mobile phone application. Motor controllers: If linear actuator is DC non-stepper based, L298 or equivalent. If stepper-based, A4988 or equivalent. Relay module: consists of a set of contactor relays, solid state relays, or other relays. Relays controlled by micro-controller. May be replaced by individual relays or other logic-based schemes. Solid-state relay: Solid state relay for driving the heating element(s). May be replaced by SSVR, contactor relays, or other mechanisms for controlling the heating element power. Touch screen display optional.

The semi-automated vessel-in-vessel beer brewing and precision timed cooking system of the present disclosure generally works by following a process with multiple steps or phases. Generally speaking, one of the first sets of steps in the beer brewing process is producing wort, which is sugary liquid extracted from grains. Wort production starts with soaking grain in water, such as grain 10d soaking in the mash water 10c, at specific temperatures so that the enzymes present in the grain convert complex starches into simpler sugars, called mashing. After this conversion process, the sugars and other substances from the mash must be extracted from the grain. The typical process involves draining the water out from the mash. Additional water may be added to the mash while the water is draining or after all of the water has drained to wash additional sugars out from the grains in a process called sparging. Sparging is generally an optional step in the brewing process, since it may be performed or optionally not performed at all. Furthermore, sparging can be performed in several ways. To maximize extraction efficiency, some brewing methods involve draining the liquid (now called wort) out slowly, while continuously adding additional fresh water to the mash. Continuous sparging, or "fly sparging" as it is called, is considered an efficient way (some would say the most efficient way) to extract sugars from the mash. Home brewers often use a brewing vessel design known as a vessel-in-vessel or all-in-one design to produce wort, due to their flexibility and relatively compact size. All commercial all-in-one brewing systems include a built-in heating element and temperature sensing system. Most additionally include a pump and circulation system to circulate the wort through the grain during mashing to maintain even temperatures.

In some embodiments, the semi-automated vessel-in-vessel beer brewing and precision timed cooking system includes a computer-controlled lifting mechanism or hoisting mechanism that automatically lowers the grain into the outer vessel water at pre-specified times and temperatures, without the need for any human intervention. Furthermore, in some embodiments, the semi-automated vessel-in-vessel beer brewing and precision timed cooking system lowers the grain in slowly. In some embodiments, this slow lowering of the grain in from the top removes the need to stir the grain bed to break up grain clumps. In some embodiments, the combination of heating element(s), thermocouple, pump, and the re-circulation mechanism allows fine control of temperatures during the mashing phase. Now, when mashing is complete, the inner vessel is heavy and water-logged. Yet, when a brewer is utilizing a conventional manual labor-based, simplified vessel-in-vessel design, the completion of mashing begins the stage at which the brewer normally raises (manually) the inner vessel fully out of the outer vessel to allow the wort to drain out of the inner vessel. While the inner vessel, once pulled out of the outer vessel, is typically placed on mounting structures to rest at the top of the outer vessel (and drain), there is conventionally no mechanism with commercial vessel-in-vessel systems to remove the inner vessel other than the human labor exerted by the brewer. Since the inner vessel would be completed soaked, it would therefore be very heavy to lift for a single person, or even two people working in coordination. In addition, the brewer may pour water or spray water over the grains to wash additional sugars out of the mash. However, this form of washing is not particularly effective, as water does not filter through the entire bed of grain evenly, requiring more water to extract the same amount of sugar and diluting the wort, or requiring more grain for the same amount of sugars in the water. Furthermore, adding grain may not be feasible given limited vessel sizes. By contrast, the semi-automated vessel-in-vessel beer brewing and precision timed cooking system of the present disclosure allows a computer-controlled and automated mashing and sparging procedure.

In some embodiments, the semi-automated vessel-in-vessel beer brewing and precision timed cooking system also enables a continuous sparging procedure. Continuous sparging (fly sparging) was impractical/impossible by manual human labor. However, by utilizing the semi-automated vessel-in-vessel beer brewing and precision timed cooking system of the present disclosure, a brewer is assured that the inner vessel is slowly lifted up by linear actuators, so that wort is drained out the bottom. The speed of the lifting mechanism, in addition to level control, controls the rate of flow out of the inner vessel into the outer vessel during sparging, simply by using gravity. In some embodiments, the level-sensing mechanism can continuously add sparge water to the top of the grain, maintaining ideal sparging and grain washing conditions. As such, the semi-automated vessel-in-vessel beer brewing and precision timed cooking system of the present disclosure allows automation of the most labor intensive stages of the brewing process, from mashing to the end of the sparge and start of the boil phase and more efficiently extracts sugars with less sparge water.

Figure 2:
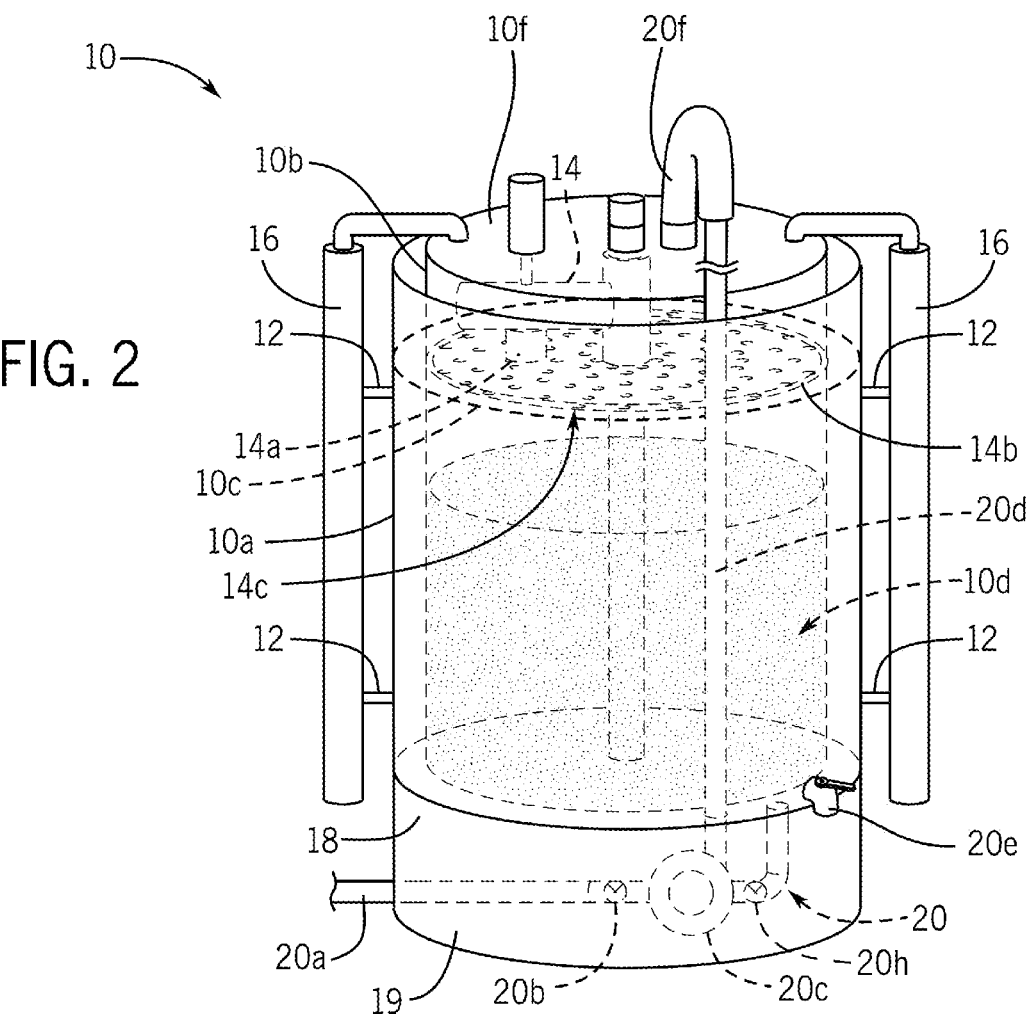
FIG. 2 conceptually illustrates a schematic perspective view of a semi-automated vessel-in-vessel beer brewing and precision timed cooking system in some embodiments.

By way of example, FIG. 2 conceptually illustrates a schematic perspective view of a semi-automated vessel-in-vessel beer brewing and precision timed cooking system 10. As shown in this figure, the semi-automated vessel-in-vessel beer brewing and precision timed cooking system 10 includes the outer vessel 10a, the inner vessel 10b, the mash water 10c, and the grain 10d. The semi-automated vessel-in-vessel beer brewing and precision timed cooking system 10 also includes a lid 10f of the inner vessel 10b, a mounting structure 12, a float 14, a float switch 14a, a manifold 14b, a perforated plate 14c, linear actuators 16, a heating element 18 with a temperature sensor, a built-in stand 19 (or built-in support structure 19), water and wort pumping system 20, an external water source 20a, an external sparge water source actuated valve 20b, a pump 20c, an outlet pipe 20d, a spigot 20e, a re-circulation inlet 20f, and an outer vessel actuated valve 20h.

In some embodiments, the combination of the outer vessel 10a, the inner vessel 10b, the mash water 10c, and the grain 10d are disposed atop the built-in stand 19. In some embodiments, the built-in stand 19 includes the heating element 18. In some embodiments, a temperature sensor is including with the heating element 18. In some embodiments, the outer vessel 10a is mounted to the mounting structure 12. In some embodiments, the linear actuators 16 are affixed to the mounting structure 12 on either side of the semi-automated vessel-in-vessel beer brewing and precision timed cooking system 10. In this way, the inner vessel 10b can be lifted out of the outer vessel 10a via the linear actuators 16. Specifically, the linear actuators 16 are electronically actuated with powered motors to perform automated lifting of the inner vessel 10b at particular times during the sparging process. In some embodiments, the linear actuators 16 lift the inner vessel 10b at a slow pace to drain wort out of the bottom of the inner vessel 10b. In some embodiments, the float 14 and the float switch 14a sense and control leveling. In some embodiments, inlet of the pump 20c of the water and wort pumping system 20 is attached to two electronically actuated valves: the external sparge water source actuated valve 20b and the outer vessel actuated valve 20h. Also, outlet of the pump 20c flows through the outlet pipe 20d into the inner vessel 10b by way of the re-circulation inlet 20f. When conditions permit as determined by the float 14 and the float switch 14a, the pump 20c and the output pipe 20 allow for sparge water from the external water source 20a to be continuously added to the top of the grain 10d through the re-circulation inlet 20f. In this way, the semi-automated vessel-in-vessel beer brewing and precision timed cooking system 10 maintains ideal sparging and grain washing conditions. Further, the semi-automated vessel-in-vessel beer brewing and precision timed cooking system 10 provides an automated solution to the most labor intensive stages of the brewing process, from mashing to the end of the sparge and start of the boil phase.

Figure 3:
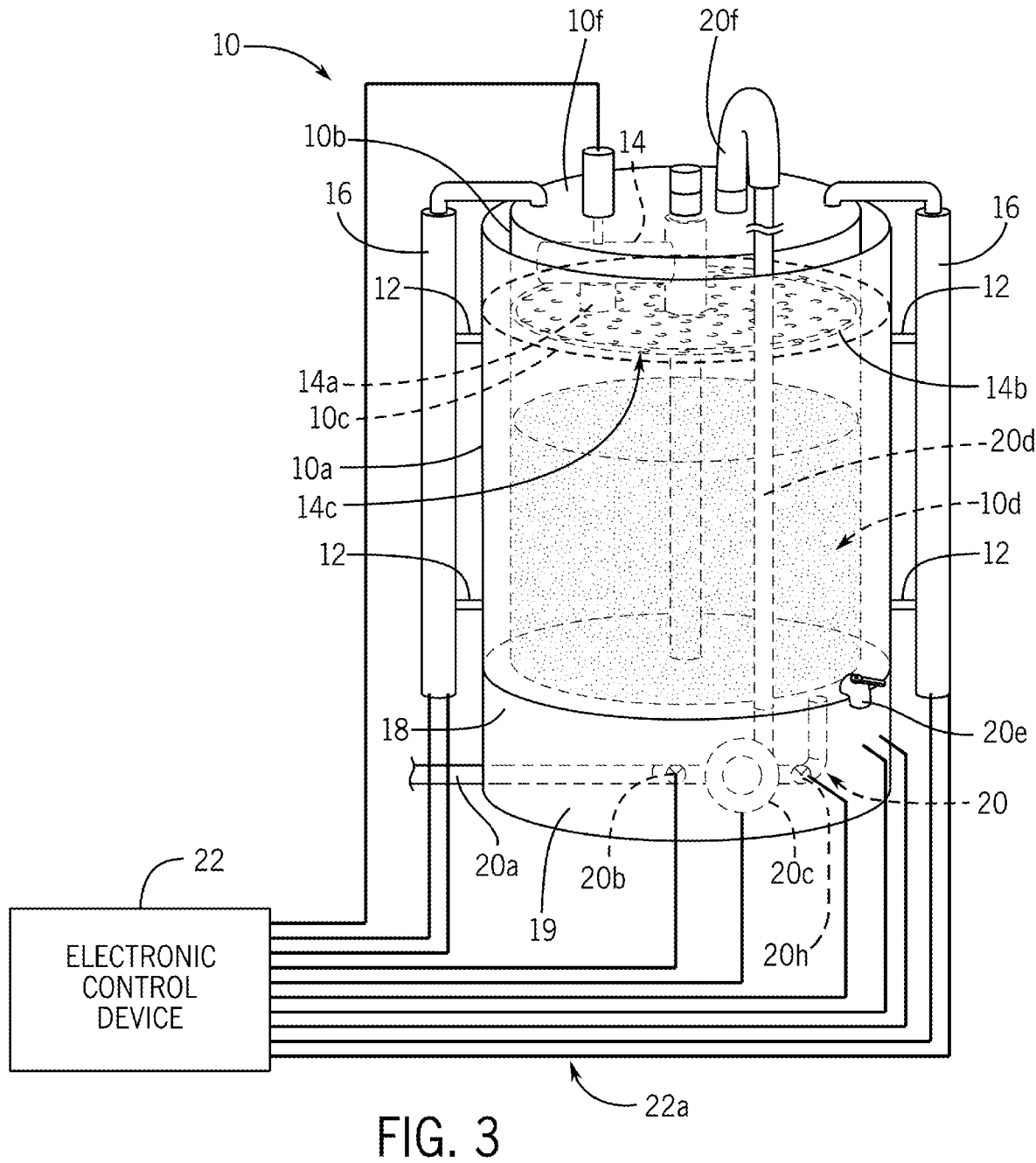
FIG. 3 conceptually illustrates a schematic perspective view of electronic wiring from an electronic control device to a semi-automated vessel-in-vessel beer brewing and precision timed cooking system in some embodiments.
Figure 4:
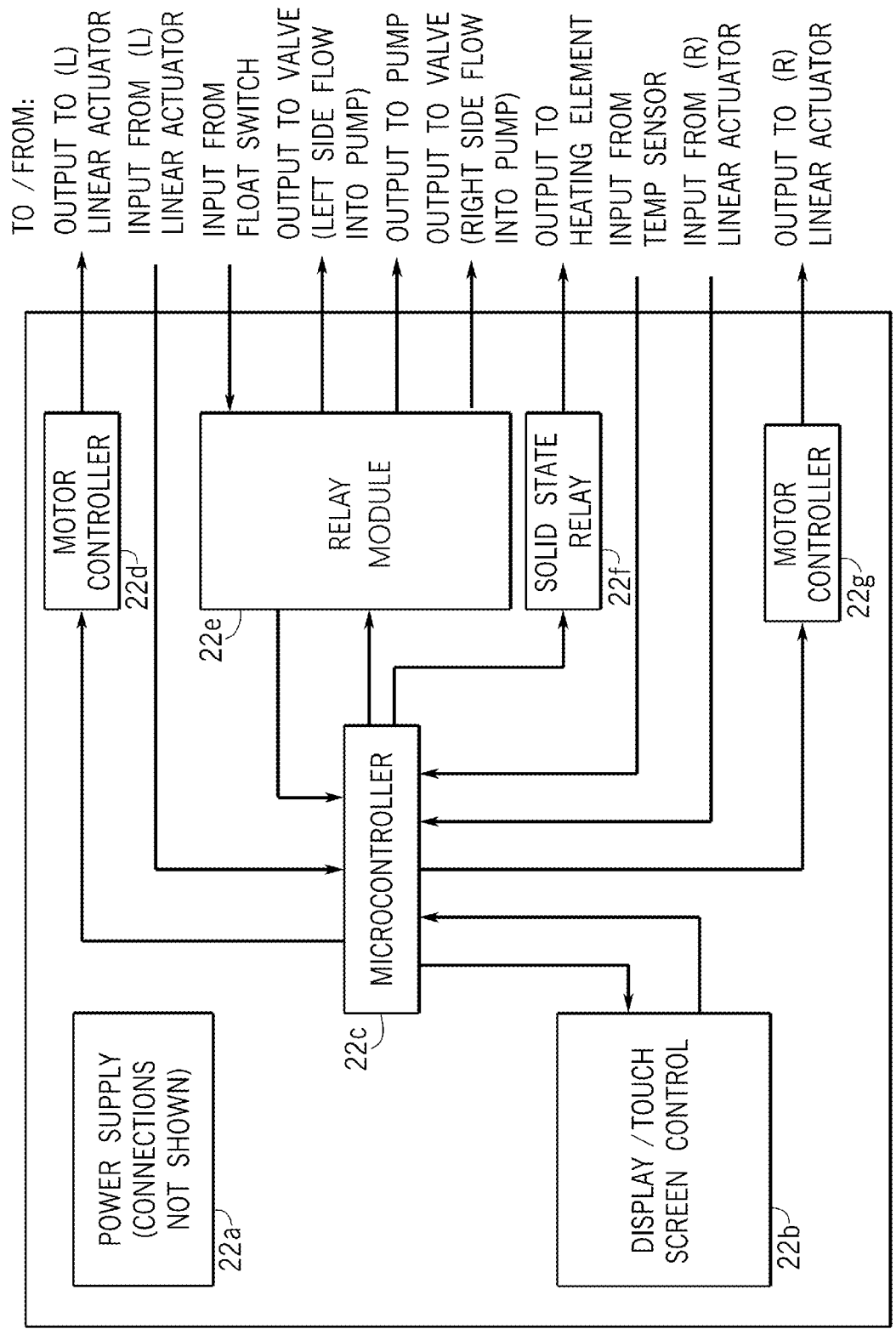
FIG. 4 conceptually illustrates a block diagram of the electronic control device with directional data input/output to and from the semi-automated vessel-in-vessel beer brewing and precision timed cooking system in some embodiments.

Now turning to another example, FIG. 3 conceptually illustrates a schematic perspective view of electronic wiring 22a from an electronic control device 22 to the semi-automated vessel-in-vessel beer brewing and precision timed cooking system 10 shown in FIG. 2. Referring also to FIG. 4, which conceptually illustrates a block diagram of the electronic control device 22 with directional data input/output to and from the semi-automated vessel-in-vessel beer brewing and precision timed cooking system 10. As shown in this figure, the electronic control device 22 includes several components, including a power supply 22a (connections to power supply 22a not shown), a display/touch screen control 22b, a micro-controller 22c, a first motor controller 22d, a relay module 22e, a solid state relay 22f, and a second motor controller 22g. The micro-controller 22c outputs commands to the first motor controller 22d, the second motor controller 22g, the display/touch screen control 22b, the relay module 22e, and the solid state relay 22f. The micro-controller 22c also receives input from the (left-side) linear actuator 16, the (right-side) linear actuator 16, the temperature sensor from the heating element 18, the display/touch screen control 22b, and the relay module 22e. The first motor controller 22d outputs motor control commands the (left-side) linear actuator 16, while the second motor controller 22g outputs motor control commands the (right-side) linear actuator 16. The relay module 22e receives input from the float switch 14a of the float 14. The relay module 22e also outputs control commands to the external sparge water source actuated valve 20b (from the left-side flow into the pump 20c), the pump 20c, and the outer vessel actuated valve 20h (from the right-side flow into the pump 20c). The solid state relay 22f outputs control commands to the heating element 18 to maintain fine control of temperatures during mashing.

Figure 5:
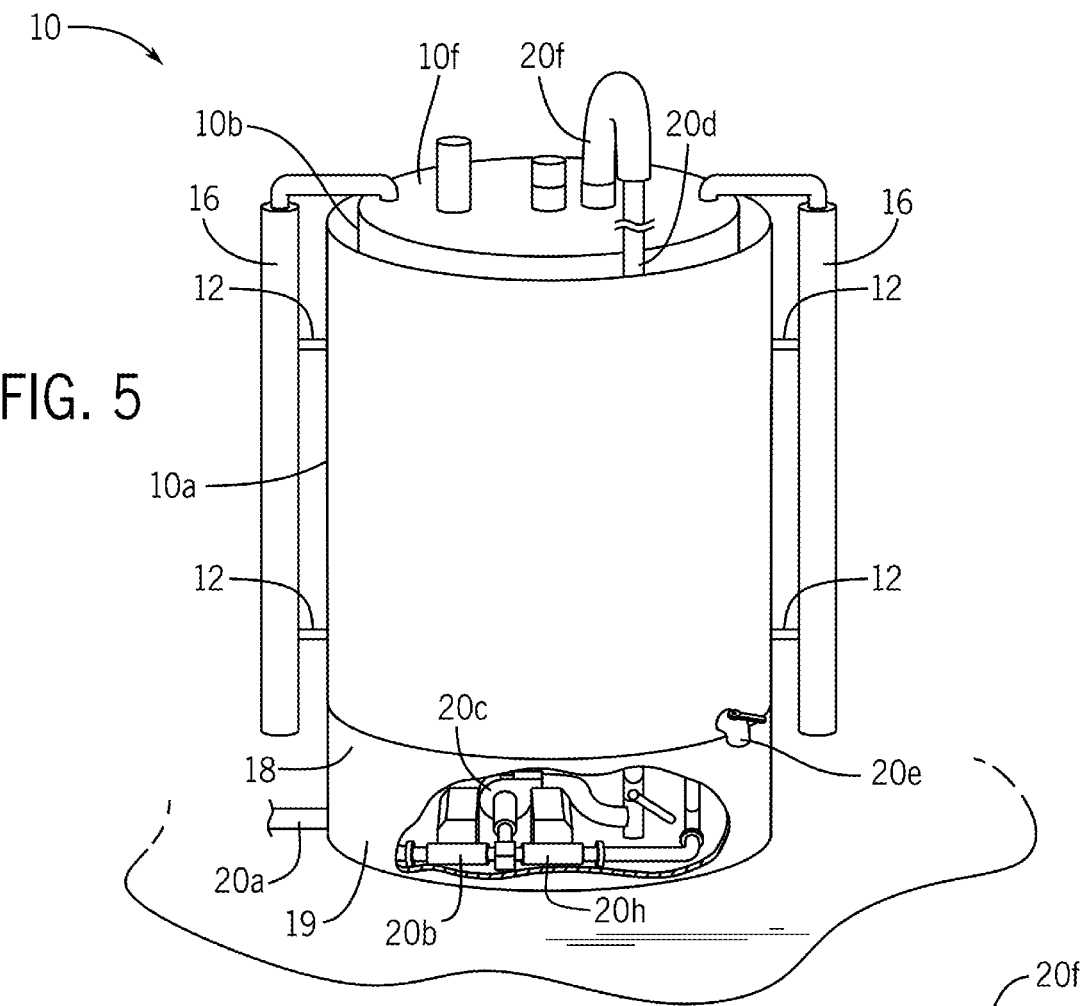
FIG. 5 conceptually illustrates a perspective view of a semi-automated vessel-in-vessel beer brewing and precision timed cooking system in use some embodiments.

Turning to another example, FIG. 5 conceptually illustrates a perspective view of a semi-automated vessel-in-vessel beer brewing and precision timed cooking system 10 in use. In this figure, the exterior of the outer vessel 10a is shown connected to the mounting structure 12 and above the built-in stand 19 with the embedded heating element 18, while the spigot 20e protrudes out from the bottom of the outer vessel 10a. The linear actuators 16 are connected to the mounting structure 12 at either side and connect to the lid 10f of the inner vessel 10b. The outlet pipe 20d is inside of and extends out and above the outer vessel 10a, connecting above the inner vessel 10b to the re-circulation inlet 20f so that outlet from the pump 20c flows through the outlet pipe 20d and into the inner vessel 10b by way of the re-circulation inlet 20f. As shown in a cut-out section of the built-in stand 19, several components of the water and wort pumping system 20 are visible including the external sparge water source actuated valve 20b, the pump 20c, and the outer vessel actuated valve 20h. In addition, the external water source 20a is shown extending out of the bottom of the built-in stand 19. In some embodiments, drain out through the bottom of the inner vessel connects to the pump 20c.

Figure 6:
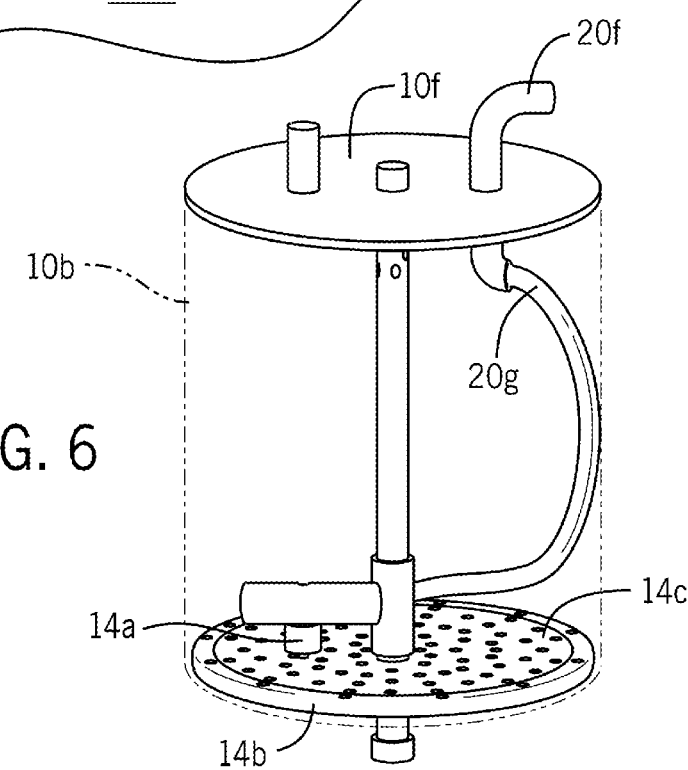
FIG. 6 conceptually illustrates a detail perspective view showing an assembly which goes inside the inner vessel of a semi-automated vessel-in-vessel beer brewing and precision timed cooking system in some embodiments.

By way of example, FIG. 6 conceptually illustrates a detail perspective view showing an assembly which goes inside the inner vessel of a semi-automated vessel-in-vessel beer brewing and precision timed cooking system in some embodiments. As shown in this figure, the assembly goes into the inner vessel 10b and includes the lid 10f, the float switch 14a, the manifold 14b, the perforated plate 14c, the re-circulation inlet 20f, and an inner vessel tube 20g. The lid 10f is disposed atop the inner vessel 10b. The re-circulation inlet 20f extends down through the lid 10f to the inner vessel tube 20g. The inner vessel tube 20g connects at the bottom to the manifold 14b.

When a semi-automated vessel-in-vessel beer brewing and precision timed cooking system is used by a brewer, the entire brewing process, from initial heating of strike water to beginning of boil, is completely automated, with no human intervention after setup. The process has several phases. During the initial phase, the linear actuators hold up the inner vessel, while the heating element heats water in the outer vessel as indicated by the temperature sensing thermocouple.

Figure 7:
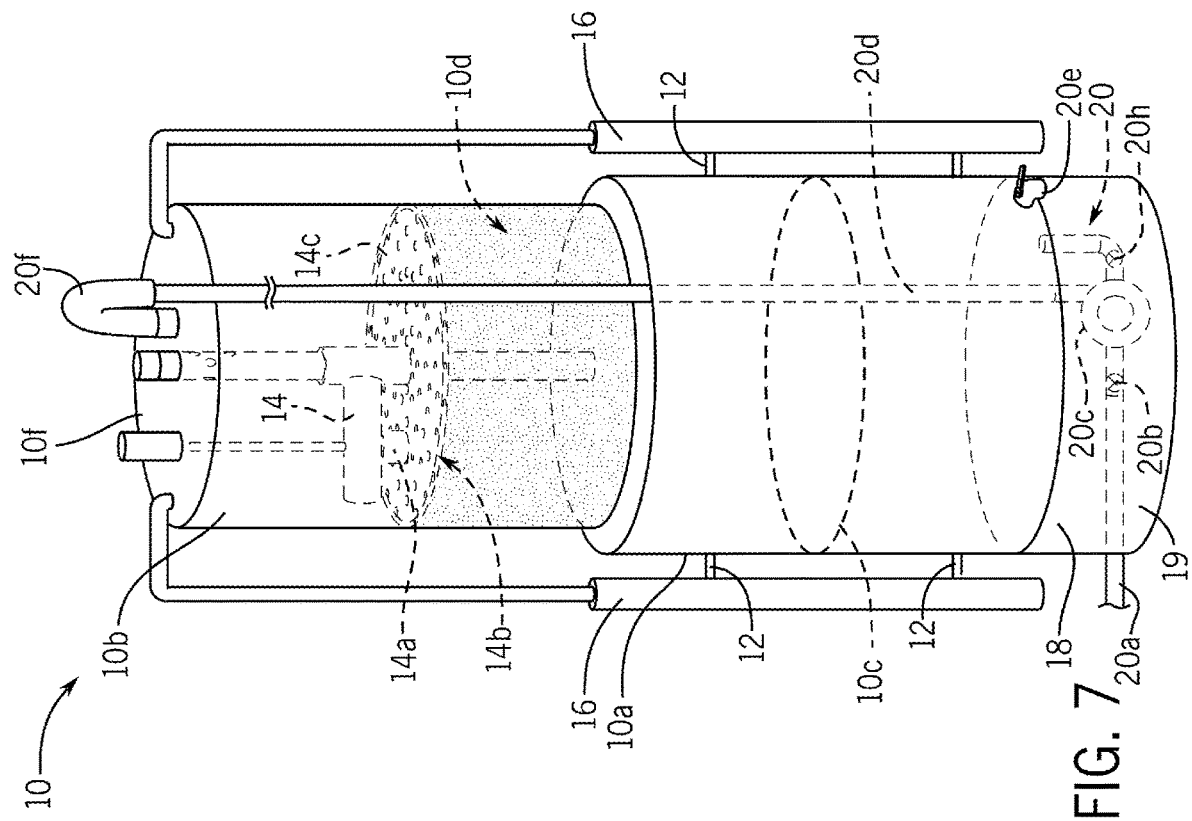
FIG. 7 conceptually illustrates a first phase of a strike-to-boil process using the semi-automated vessel-in-vessel beer brewing and precision timed cooking system in some embodiments.

By way of example, FIG. 7 conceptually illustrates a first phase of a strike-to-boil process using the semi-automated vessel-in-vessel beer brewing and precision timed cooking system 10. As shown in this figure, the linear actuators 16 are fully extended up and support the inner vessel 10b which is completely lifted out of the outer vessel 10a so that the heating element 18 can heat up the water 10c in the outer vessel 10a to a certain temperature (the "strike temperature") according to the temperature sensor of the heating element 18. During this phase, the grain sits in the inner vessel 10b (not in water) and the inner vessel 10b itself may be positioned above and out of the outer vessel 10b so as to act as a lid of the outer vessel 10a during heating of the water 10c to the strike temperature. The water and wort pumping system 20 is not pumping water during this phase as both the external sparge water source actuated valve 20b and the outer vessel actuated valve 20h are closed, and the pump 20c is off. A person (or "user") of the semi-automated vessel-in-vessel beer brewing and precision timed cooking system 10 may start the first phase of the strike-to-boil process by completing preliminary setup of the semi-automated vessel-in-vessel beer brewing and precision timed cooking system 10 the night before (or prior to commencing the strike-to-boil process). The user may thereafter start the initial process the next morning (e.g., early, 6:00 am or so) while the strike water heats up to the strike temperature, with the inner vessel 10b above and out of the outer vessel 10a.

Figure 8:
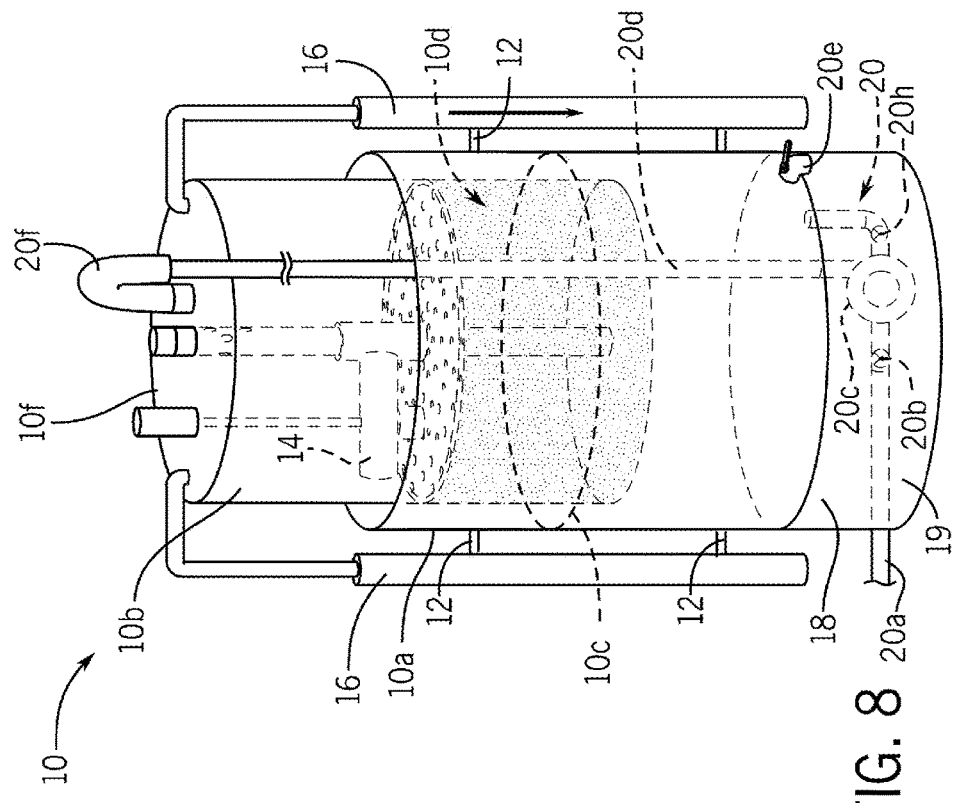
FIG. 8 conceptually illustrates a second phase of a strike-to-boil process using the semi-automated vessel-in-vessel beer brewing and precision timed cooking system in some embodiments.

When the temperature sensor detects that a given temperature is reached, the linear actuators 16 lower the inner vessel 10b into the outer vessel 10a. This is shown in FIG. 8, which conceptually illustrates a second phase of a strike-to-boil process using the semi-automated vessel-in-vessel beer brewing and precision timed cooking system 10. As shown in this figure, as the inner vessel 10b is lowered into the outer vessel 10a, the grain 10d sitting inside the inner vessel 10b starts to submerge in the heated water 10c in the outer vessel 10a. While a malt pipe is filled from the bottom, the water and wort pumping system 20 during this phase remains in the closed/off state, with the external sparge water source actuated valve 20b and the outer vessel actuated valve 20h closed and the pump 20c off The user of the semi-automated vessel-in-vessel beer brewing and precision timed cooking system 10 may start the second phase of the strike-to-boil process after a short time of heating (e.g., 45 minutes or whatever amount of time is needed to reach the strike temperature). The user actually does not need to be involved in any way at this point because the second phase of the strike-to-boil process is triggered automatically when the temperature sensor detects that the water 10c has been heated to the requisite strike temperature. Thus, lowering of the linear actuators 16 (and lowering of the inner vessel 10b) occurs automatically. The grain 10d is thereby soaked by the slow lowering of the inner vessel 10b by the linear actuators 16.

The linear actuators 16 continue to slowly lower the inner vessel 10b into the outer vessel 10a. The slow process of lowering the inner vessel 10b may take some time (e.g., 30 minutes or so). This results in full submersion and soaking of the grain 10d in the heated water 10c until the inner vessel 10b reaches the bottom of the outer vessel 10a, at which point the linear actuators 16 stop moving down. When the inner vessel 10b finally reaches the bottom inside the outer vessel 10a, a short stationary soaking period (e.g., a few minutes) may commence to allow the grain 10d to fully soak in the heated water 10c, before the program moves to the recirculating mashing stage, which is described below, by reference to FIG. 10.

Figure 9:
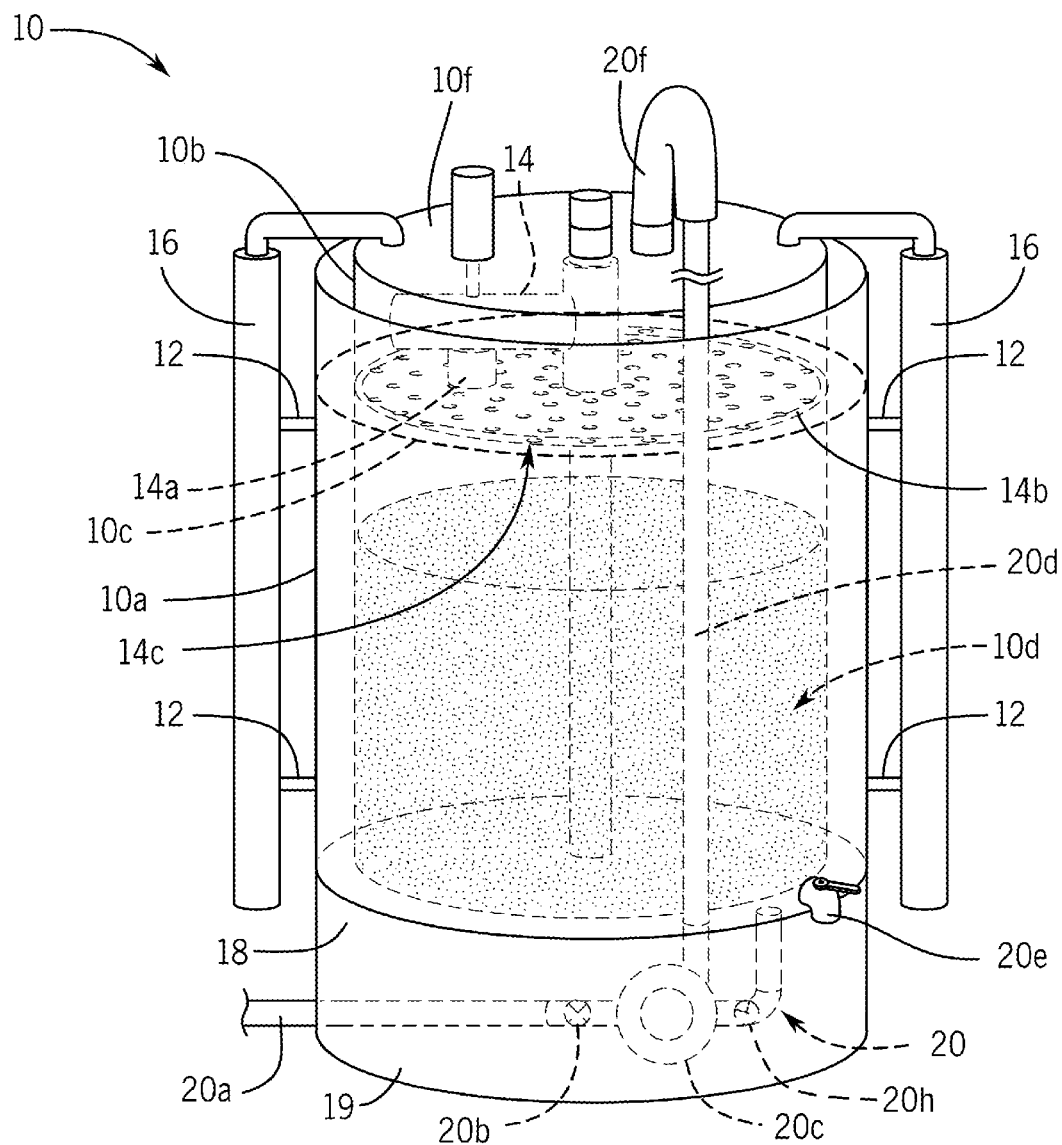
FIG. 9 conceptually illustrates a third phase of a strike-to-boil process using the semi-automated vessel-in-vessel beer brewing and precision timed cooking system in some embodiments.

Turning now to another phase when soaking occurs, FIG. 9 conceptually illustrates a third phase of a strike-to-boil process using the semi-automated vessel-in-vessel beer brewing and precision timed cooking system 10. As shown in this figure, the inner vessel 10b is fully lowered into the outer vessel 10a of the semi-automated vessel-in-vessel beer brewing and precision timed cooking system 10 and the linear actuators 16 are completely lowered. Also, the short soaking period ends after full saturation of the grain 10d within the heated water 10c. Full saturation of the grain 10d is demonstrated by the float switch 14a triggering, which indicates that the water level must have raised above the grain 10d and soaked through. The water and wort pumping system 20 during this phase remains in the closed/off state, with the external sparge water source actuated valve 20b and the outer vessel actuated valve 20h closed and the pump 20c off During the next phase, the grain 10d continues to soak in the water 10c, with the temperature of the grain 10d and water 10c maintained by the heating element 18 and monitored by the temperature sensor (or temperature sensing thermocouple). The pump 20c may be activated and directed through the bottom to the pump inlet and then to the now open re-circulation valve and through the water distribution and manifold mechanism at this time. This phase may have several sub-phases, going through pre-specified steps with different temperatures and times each. When the time is completed for these subphases, the routine moves into the next phase.

Figure 10:
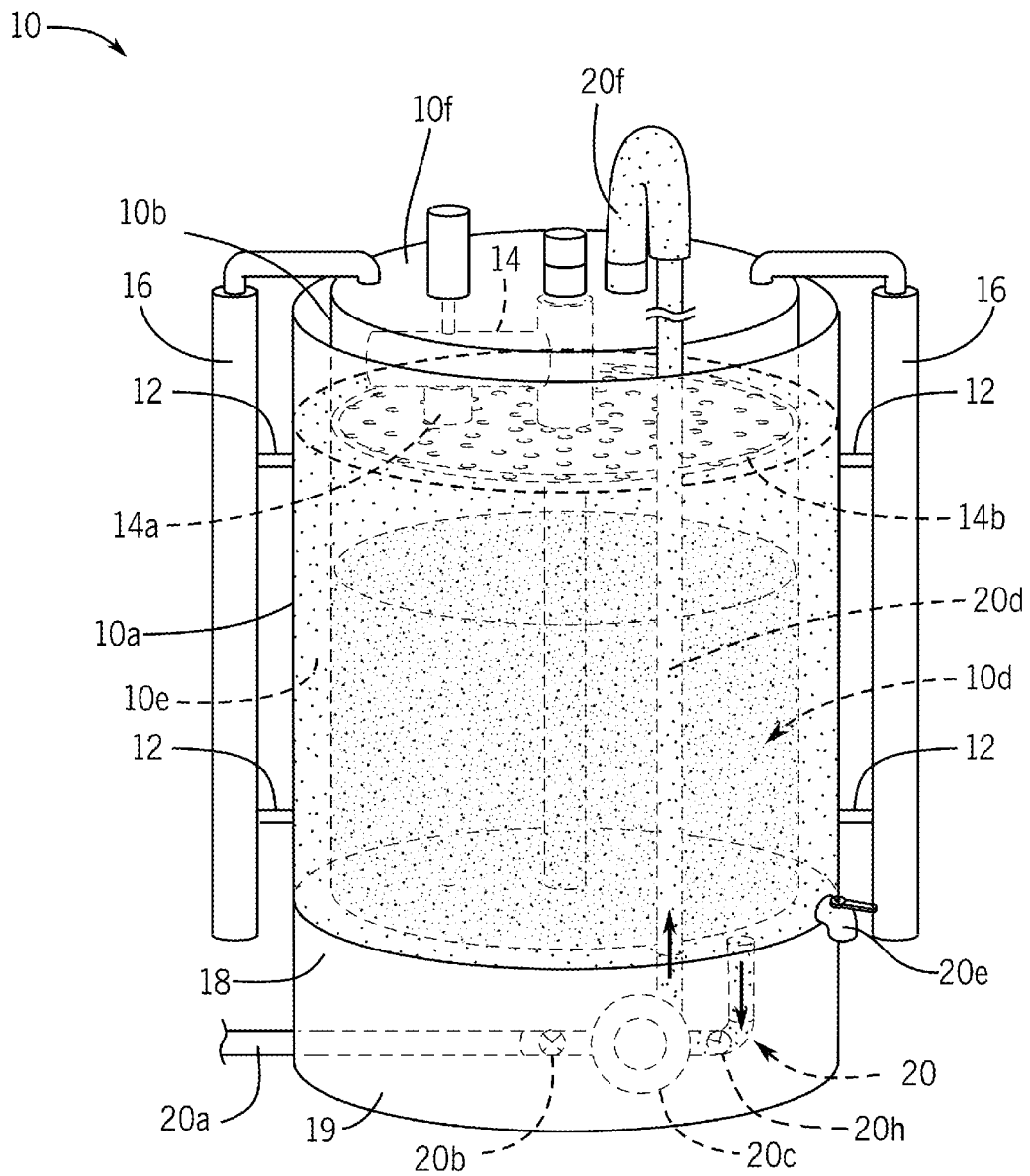
FIG. 10 conceptually illustrates a fourth phase of a strike-to-boil process using the semi-automated vessel-in-vessel beer brewing and precision timed cooking system in some embodiments.

By way of example, FIG. 10 conceptually illustrates a fourth phase of a strike-to-boil process using the semi-automated vessel-in-vessel beer brewing and precision timed cooking system 10. Although the external sparge water source actuated valve 20b remains in the closed/off state, the water and wort pumping system 20 is activated by electronic actuation of the outer vessel actuated valve 20h to an open state and by activation of the pump 20c. During the fourth phase of the strike-to-boil process, wort 10e and water are pumped through the inner manifold 14b and the perforated plate 14c, and through the grain 10d until being drained out the bottom of the inner vessel 10b and back into the outer vessel 10a for heating, to maintain temperatures and ensure efficient mashing. The fourth phase of the strike-to-boil process can continuously recur many times before moving on to the next phase of the process. For example, the fourth phase of the strike-to-boil process may last for an hour while it continuously recurs during the hour. The re-circulation is also optional and may not be desired in all situations or by all brewers.

In some embodiments, an optional sparging phase occurs when sparging is desired. Initially, the pump is turned off, the re-circulation valve is closed, and the sparge water valve is opened. The linear actuators lift up slowly. As the linear actuators lift up, the wort/water drains out of the bottom of the inner vessel. When the float switch is no longer floating, but is at the mash level, a trigger activation of the pump occurs, so that more sparge water will be pumped to the top. This is done by the water pump electronically actuated to turn on, which then forces sparge water through water distribution mechanism until liquid level-sensing mechanism reports liquid level has been raised sufficiently. The process continues until there is no more sparge water and/or the pre-specified sparge water volume has been pumped.

Figure 11:
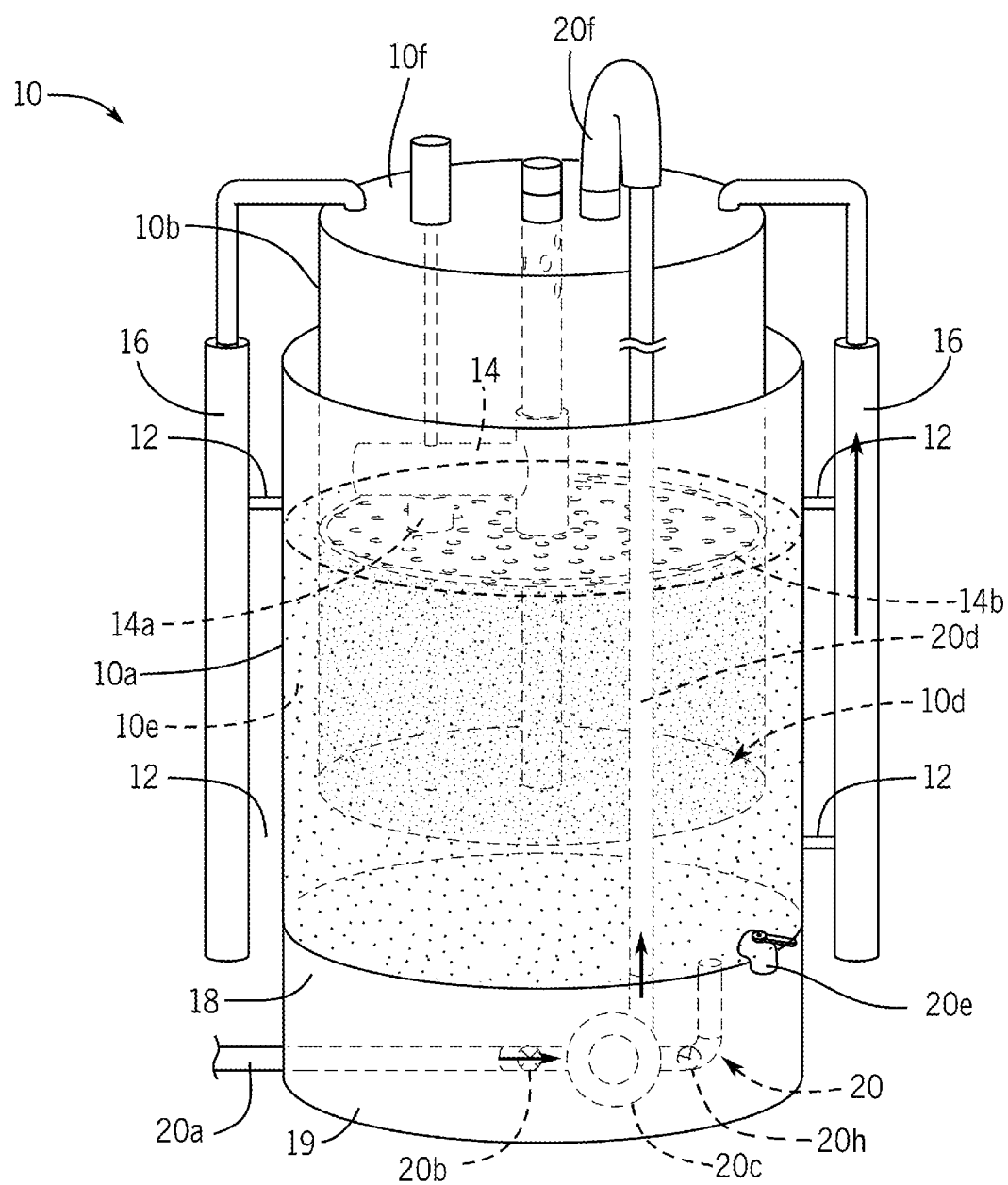
FIG. 11 conceptually illustrates an optional fifth phase of a strike-to-boil process using the semi-automated vessel-in-vessel beer brewing and precision timed cooking system in some embodiments.

By way of example, FIG. 11 conceptually illustrates this optional fifth phase of the strike-to-boil process using the semi-automated vessel-in-vessel beer brewing and precision timed cooking system 10. As shown in this figure, the inner vessel 10b is slowly lifted by the linear actuators 16 out of the outer vessel 10a until the float switch 14a of the float 14 is triggered when contact is made with the mash in the inner vessel 10b and their level begins to rise along with the mash in the inner vessel 10b. The wort 10e remains in the outer vessel 10a as the linear actuators 16 raise the inner vessel 10b up. The electronic control device 22 then electronically actuates the external sparge water source actuated valve 20b and the pump 20c to start pumping external sparge water up through the outlet pipe 10d and through the re-circulation inlet 20f, eventually ending up in the inner vessel 10b. Since the pump 20c is connected to the external sparge water source 20a and the external sparge water source actuated valve 20b is open, the water form the external sparge water source 20a is pumped up the outlet pipe 20d, which itself is slowly lifted along with the inner vessel 10b, by way of the linear actuators 16. As the inner vessel 10b rises, some of the wort 10e drains out of the bottom of the inner vessel 10b and into the outer vessel 10a where the bulk volume of wort 10e resides. The pump 20c and the float switch 14a keep some sparge water (e.g., typically one to two inches of sparge water), which is completed when the sparge volume is reached, as determined by height. The heating element 18 heats the wort 10e not to exceed a threshold temperature during the fifth phase of the strike-to-boil process. Thus, the heating element 18 is automatically turned on or off according to the detected temperature of the wort 10e, which ensures that the wort 10e does not exceed the threshold temperature during the fifth phase of the strike-to-boil process. For example, the threshold temperature is typically configured to be 168° Fahrenheit during the fifth phase of the strike-to-boil process.

As an alternative, some embodiments of the semi-automated vessel-in-vessel beer brewing and precision timed cooking system 10 replace the float switch 14a and/or the electronically actuated valves with other level-sensing or level-keeping mechanisms. In some embodiments, sparge water volume can be determined by limiting sparge water volume in the outer vessel 10a or by change in height of the inner vessel 10b. In some embodiments, one or more of the valves can be replaced by separate pumps for the outer vessel 10a, wort 10e and sparge water or by three-way or similar actuated valves.

Figure 12:
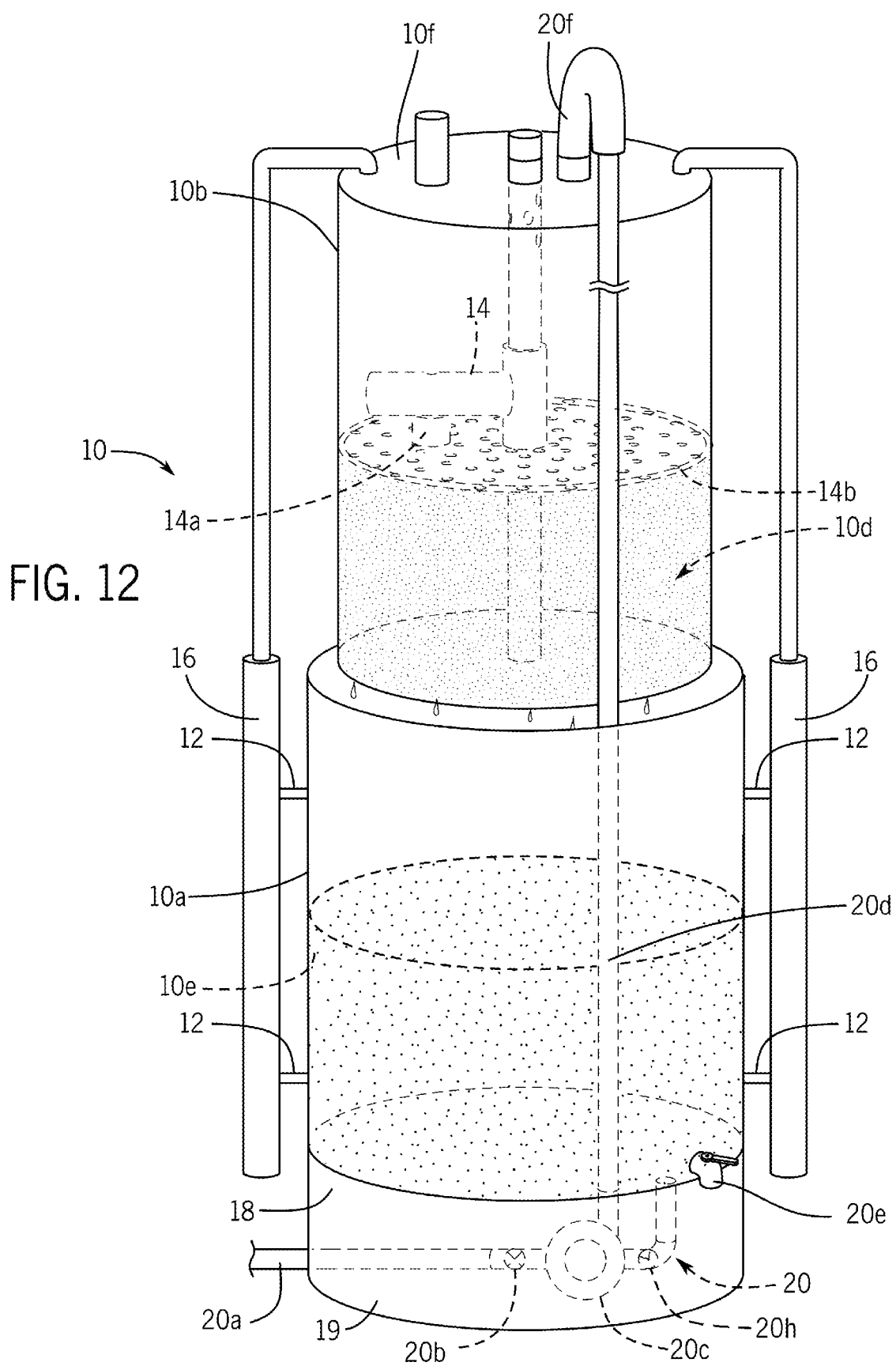
FIG. 12 conceptually illustrates a sixth phase of a strike-to-boil process using the semi-automated vessel-in-vessel beer brewing and precision timed cooking system in some embodiments.

If no sparging is desired, or after sparging is completed (during the fifth phase of the strike-to-boil process), both valves and the pump are turned off/closed, and the lifting mechanism may lift the inner vessel out of the outer vessel at this time. By way of example, FIG. 12 conceptually illustrates a sixth phase of the strike-to-boil process using the semi-automated vessel-in-vessel beer brewing and precision timed cooking system 10. During the sixth phase, the semi-automated vessel-in-vessel beer brewing and precision timed cooking system 10 is set for heating to boil. As shown in this figure, the water and wort pumping system 20 is inactive with the external sparge water source actuated valve 20b closed, the outer vessel actuated valve 20h closed, and the pump 20c turned off. During the sixth phase, the wort 10e continues heating to a boil. The inner vessel 10b acts as a lid of the outer vessel 10a to ensure efficient heating and continues to drip drain into the outer vessel 10a (thereby reducing potential mess). Additionally, the inner vessel 10b is lifted by the linear actuators 16 entirely out of the outer vessel 10a when approaching boil temperatures to avoid foaming over. Then, once the boiling point is reached, the semi-automated vessel-in-vessel beer brewing and precision timed cooking system 10 continues to brew as normal.

To make the semi-automated vessel-in-vessel beer brewing and precision timed cooking system of the present disclosure, one can plan to build it as an add-on to an existing simplified vessel-in-vessel brew system or build it separately as a single, all-in-one vessel-in-vessel brewing system. In the add-on configuration, the building procedures begin with a prefabricated all-in-one vessel-in-vessel home brewing system, which includes the inner vessel, the outer vessel, heating elements, (optionally) the pump, and (optionally) an electronic control mechanism. The pre-fabricated brewing system may or may not include mounting points designed for this device.

The mounting structure for the lifting/hoisting mechanism is mounted directly to the outer vessel through bolts or other fastening devices, or externally through an external frame. The linear actuators (or whatever lifting mechanism is used) is attached to the inner vessel through a mounting fasteners, such as bolts, chains, or other connecting mechanisms.

The electronic control device is assembled, wired, and attached to all electronic parts and electronically actuated components of the semi-automated vessel-in-vessel beer brewing and precision timed cooking system. The components of the water and wort pumping system (or other such plumbing mechanisms) are attached to each other through pipes, hoses, and plumbing fittings. Alternatively, the semi-automated vessel-in-vessel beer brewing and precision timed cooking system may be produced with all parts mounted already on the vessel-in-vessel system.

There are several subsystems which could be reconfigured or replaced to achieve functionally near-equivalent systems. Specifically, the linear actuators may be replaced with a number of alternative lifting mechanisms including, without limitation, a hoisting/winch system, an outer-vessel lowering system (including using gravity lowering), any other system to change the vertical distance between the inner and outer vessels, etc. Also, the inner manifold for sparge and/or recirculated wort distribution may be replaced with a number of non-manifold systems to distribute water or wort on top of the grain including, without limitation, a simple hose, a spraying system from the lid, a system which directs water or wort to flow down the walls of the inner vessel, etc. Additionally, the liquid level sensing (by float and float switch) may use a number of mechanisms, including, without limitation, weight, hydrostatic pressure, ultrasonic sensors, mechanical float valves, etc. Alternatively, flow meters and careful calibration may be used to finely control flow rates into the inner vessel. Also, the two actuated valves and the pump of the water and wort pumping system may be reconfigured in a number of ways. One simple alternative is to eliminate the two valves, have the spigot 20e or outlet attached directly to the main pump 20c, and have a separate pump going from the external sparge water source to the inner vessel inlet or liquid distribution system. Another alternative is a three-way actuated valve, which can select the input to be either the sparge water or the outer vessel spigot 20e (or outlet).

To use the semi-automated vessel-in-vessel beer brewing and precision timed cooking system of the present disclosure, an individual user would generally expect to follow several pre-brewing setup procedures, followed by several brewing process procedures. For the pre-brewing setup procedures, the user configures or pre-programs the settings desired concerning pre-set times, temperatures, and sparging procedures for the particular brew in question. The lifting/hoisting mechanisms starts with the lifting the inner vessel out of the outer vessel. Grain for brewing is then placed in the inner vessel while water for mashing is placed in the outer vessel. The manifold assembly is placed on top of the grain bed, and all hoses, pipes, and electronics are connected as described above.

During the brewing process, the user would generally follow several phased sets of procedures including pre-mash procedures, mash procedures, sparging procedures, and post-sparge phase procedures. Starting with the pre-mash procedures, the heating mechanism heats the water to a threshold temperature that is configured, specified, or programmed during the pre-brewing setup procedures. When the threshold temperature is reached, the inner vessel is slowly lowered into the outer vessel, soaking the grains. This ends the pre-mash procedures.

The mash procedures follow the pre-mash procedures. The mash procedures include regulating temperature during the mashing process. Temperature is regulated through use of the heating element and thermocouple (or other temperature sensor). Optionally, the mash water is recirculated through the grains via the pump and valves, aiding in temperature regulation. Multiple mashing temperatures and times are allowable, and controlled by the software and computing hardware, such as the electronic control device 22, described above by reference to FIGS. 3 and 4.

Sparging procedures occur after the mashing process is completed. Since sparging is an optional phase of the brewing process, the procedures that are followed depend on whether the user desires for no sparging or intends to have sparging performed. If no sparging is desired by the user, then all of the pumps and valves are shut off and the linear actuators or other lifting/hoisting mechanism simply lifts the inner vessel out of the outer vessel, draining the wort into the outer vessel. When the inner vessel has reached the specified height at which the heating to boil phase begins, the sparging phase (with no sparging) is completed.

On the other hand, if the user intends for sparging to occur, then the valves are set to disable flow from the outer vessel and to allow flow from sparging water (e.g., from the external sparge water source 20a). Then the linear actuators or other lifting/hoisting mechanism begins to very slowly lift the inner vessel out of the outer vessel. The level of the water in the inner vessel is continuously monitored by the level sensing device (float/float switch). By the combination of the level sensing and the water distribution mechanisms, a constant level of water is maintained. For example, when the water drains below the float switch level, the pump (or valve) is triggered to pump (or allow) new water into the inner vessel until the water level reaches the float switch again. Also, while this example describes the combination of level sensing by the float/float switch and sparge water distribution mechanism, it is intended in this disclosure that any other combination of level sensing and keeping mechanism is covered by this procedure. When sufficient sparge water has been added, the sparge water distribution mechanism is ceased. However, the linear actuators or other lifting/hoisting mechanism continues slowly until the maximum height is reached. Once the specified height is reached at which the heating to boil phase begins, sparging is completed.

After sparging procedures are completed (whether or not the user desired sparging), the post-sparge phase procedures are followed. At this point, the brewing process typically involves boiling the wort, adding hops and other additives. The semi-automated vessel-in-vessel beer brewing and precision timed cooking system may automatically raise the temperature of the wort to a boil from this point, to continue with subsequent brewing phases. The procedures which follow from this point forward are well-known in the field and proceed accordingly.

In some embodiments, the semi-automated vessel-in-vessel beer brewing and precision timed cooking system may adapted for use as a timed precision temperature cooking device, similar to a sous vide cooker but with automated water bath ingress/egress. For example, a person can cook an egg at exactly 190° Fahrenheit for exactly six minutes by setting the semi-automated vessel-in-vessel beer brewing and precision timed cooking system to heat the water to 190° Fahrenheit, lower the eggs into the water, and raise the eggs out of the water after six minutes. Also, while the semi-automated vessel-in-vessel beer brewing and precision timed cooking system is intended to produce beer, it can be used to produce any food item which is cooking in a liquid bath or is liquid extracted from a substrate. Essentially, anything that is cooked in a water-based substance at specific times and temperatures. Therefore, the system can be adapted for brewing of beer, coffee, tea, any other steeped beverage.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A semi-automated vessel-in-vessel beer brewing and precision timed cooking system comprising:
    an outer vessel that is configured to hold mash water;
    an inner vessel that fits within the outer vessel and is configured to hold a bed of grain;
    an inner vessel lid that covers an opening atop the inner vessel after the bed of grain is added to the inner vessel;
    a pair of motorized linear actuators that lift the inner vessel out of the outer vessel and lower the inner vessel into the outer vessel during brewing;
    a mounting structure that secures the linear actuators to the outer vessel;
    a manifold through which sparge water is flushed to wash the bed of grain in the inner vessel;
    a float and float switch that provide a level sensing mechanism disposed atop the manifold;
    a built-in support structure positioned under the outer vessel to support the outer vessel;
    a heating element with a temperature sensor embedded within the built-in support structure and configured to heat the sparge water and wort to specified temperatures;
    a water and wort pumping system comprising one of a first water and wort pumping system and a second water and wort pumping system, wherein the first water and wort pumping system comprises an external sparge water source actuated valve, an outer vessel actuated valve, and a first pump, wherein the second water and wort pumping system comprises the first pump and a second pump that is configured to operate as an alternative to the external water source actuated valve and the outer vessel actuated valve of the first water and wort pumping system, wherein the water and wort pumping system is configured to pump water from an external water source over the grain in the inner vessel and to drain wort and water out of a bottom of the inner vessel into the outer vessel and to re-circulate drained wort and water; and
    an electronic control device that is configured to automatically control timing, temperature, and actuation of valves and devices during brewing, wherein the valves and devices actuated by the electronic control device comprise the external sparge water source valve that is automatically opened and closed by the electronic control device during brewing, the outer vessel valve that is automatically opened and closed by the electronic control device during brewing, the first pump that is automatically shut off and turned on by the electronic control device during brewing, the float switch, the linear actuators, and the heating element when the water and wort pumping system is the first water and wort pumping system, wherein the valves and devices actuated by the electronic control device comprise the first pump that is automatically shut off and turned on by the electronic control device during brewing, the second pump, the float switch, the linear actuators, and the heating element when the water and wort pumping system is the second water and wort pumping system.

2. The semi-automated vessel-in-vessel beer brewing and precision timed cooking system of claim 1, wherein the electronic control device comprises a power supply that provides power to the electronic control device, a display screen that visually outputs information during brewing, a micro-controller that runs a brewing program that includes sets of program instructions and configuration settings, a motor controller that controls the linear actuators to move up and down according to program instructions received from the micro-controller, a solid state relay that receives program instructions for heating from the micro-controller and outputs commands to the heating element, and a relay module that receives level sensing data from the float and float switch and outputs commands to actuate one of a first set of components of the first water and wort pumping system including the external water source actuated valve, the outer vessel actuated valve, and the first pump, and a second set of components of the second water and wort pumping system including the first pump and the second pump.

3. The semi-automated vessel-in-vessel beer brewing and precision timed cooking system of claim 2, wherein the water and wort pumping system further comprises an external water source channel, an outlet channel that connects to an outlet of the pump and through which water and wort are configured to flow, a re-circulation inlet that connects at an inflow end to an opposite end of the outlet channel and connects at an outflow end to the lid of the inner vessel to re-circulate water and wort during brewing, wherein the external water source channel comprises one of an external water source pipe and an external water source channel hose, wherein the outlet channel comprises one of an outlet pipe and an outlet hose.

4. The semi-automated vessel-in-vessel beer brewing and precision timed cooking system of claim 3 further comprising an inner vessel tube that connects at a first end to the re-circulation inlet and at a second opposing end to the manifold.

5. The semi-automated vessel-in-vessel beer brewing and precision timed cooking system of claim 1, wherein the drained water is wort that is heated and re-circulated during sparging.

\* \* \* \* \*